Patented Oct. 27, 1942

2,300,180

UNITED STATES PATENT OFFICE 2,300,180

STABILIZING CELLULOSE ESTERS

Ferdinand Schulze, Waynesboro, Va., assignor to E. I. du Pont de Nemours & Company, Wilmington, Del., a corporation of Delaware No Drawing. Application March 7, 1940, Serial No. 322,763

2 Claims. (Cl. 260—230)

The present invention relates to a new and improved process for the production of cellulose acetate, and other organic acid esters of cellulose, which will be exceedingly stable and suitable for use in molding powder in compression and injection molding processes.

The invention will be described with specific reference to the production of cellulose acetate, it being understood that it will be equally applicable to the production of other organic acid esters of cellulose.

In the currently used commercial manufacturing processes, it is customary to acetylate cellulose with acetic anhydride, in the presence of acetic acid as the solvent and a quantity of sulfuric acid as the catalyst. Sulfuric acid is usually present in the acetylation mixture to the extent of from 3% to 10%, based on the weight of the air-dry cellulose. The resultant cellulose triacetate solution is treated with a quantity of aqueous acetic acid and an additional quantity of sulfuric acid to hydrolyze the product to an acetone-soluble material. As a consequence of the use of sulfuric acid in the production of the cellulose acetate, sulfur-containing radicals, for example, sulfate radicals, remain as an integral part of the final product. The amount of sulfate combined with the cellulose acetate may be only from 0.03% to 0.07% (calculated as $H_2SO_4$), but in spite of its relatively minute concentration, it has far-reaching detrimental effects on the physical and chemical properties of the cellulose acetate. It is well known, for example, that the stability to heat of cellulose acetate is seriously diminished by the presence of a small amount of combined sulfates. Combined sulfates also influence the stability of the cellulose acetate to hydrolysis by water. Instability of cellulose acetate to heat is manifested by darkening and embrittlement of manufactured articles such as molded plastics or film. Instability to hydrolysis causes embrittlement of the manufactured articles, and in photographic film base it has a serious effect on the photographic emulsion.

It has been determined that the combined sulfate in cellulose acetate is in the form of a half ester of sulfuric acid. When cellulose acetate containing the combined sulfate half ester is washed with hard water, metal cations displace the hydrogen of the sulfate half ester, that is, the sulfate half ester becomes neutralized with cations such as calcium or magnesium which are normally present in hard water. As a result of this neutralization, the stability of cellulose acetate to heat and hydrolysis is greatly improved and for that reason it has in the past been considered necessary and desirable to wash cellulose acetate with hard water, or to actually add additional mildly alkaline agents such as sodium bicarbonate, calcium carbonate or magnesium carbonate to the mixture during washing. This method of stabilization products a product that is satisfactory for many industrial uses.

In the development of cellulose acetate for molding powder, it was at first assumed that the discoloration of cellulose acetate compositions during molding was caused by the presence of combined sulfate half esters and could be eliminated by the neutralization of the sulfate half esters with calcareous matter. It has now been found, however, that in the presence of an excess quantity of calcareous matter in cellulose acetate, the discoloration actually becomes worse. It has furthermore been found that discoloration of cellulose acetate compositions during molding can be minimized by reducing, or eliminating, this excess quantity of calcareous mineral matter.

The discoloration of molding powder is found to be a two-stage phenomenon. The presence of calcium, magnesium, or sodium salts causes discoloration to a yellow or light brown color at relatively low temperatures, for example from 150° to 200° C. At higher temperatures, for example from 200° to 300° C., another type of discoloration sets in which is caused by combined sulfate in the cellulose acetate. It appears that low temperature discoloration of cellulose acetate molding powders is caused by substances having an alkaline reaction, whereas high temperature discoloration is caused by substances having an acid reaction.

Cellulose acetate molding powders are employed for both compression and injection molding. It is, therefore, customary to test samples of molding powder for stability by making test molded pieces by both compression and injection methods. Because compression molding is usually carried out at a lower temperature than injection molding, the former will indicate whether or not the cellulose acetate is contaminated with calcareous mineral matter, while the latter test will indicate the presence or absence of objectionable amounts of combined sulfate.

From the above discussion, it is apparent that to be satisfactory for use in molding powder, cellulose acetate must contain a minimum of combined sulfate, must be substantially free from salts having an alkaline reaction and, of course, free from undesirable coloring matters and organic or inorganic impurities that might affect its clarity It is an object of the present invention to produce a cellulose derivative, such as cellulose acetate, which is uniform in its composition and of such a high quality that it is suitable for use in molding powder.

Other objects of the invention will appear hereinafter.

The objects of the invention are accomplished, in general, by incorporating, in cellulose acetate containing sulfuric acid half esters, alkali metal or alkaline earth metal salts, such as calcium, magnesium or sodium salts in an amount exceeding that necessary for the neutralization, by the ionized metal cations, of the sulfuric acid half esters, and then carefully removing only the excess salts from the cellulose acetate.

Example I

One hundred parts of air-dry cotton cellulose are treated with 620 parts glacial acetic acid. After mixing for 45 minutes, there is added a quantity of acetic anhydride molecularly equal to the quantity of water present in the mixture, and an additional quantity of 7½ parts of acetic anhydride. Fifteen minutes later there is added a solution containing 175 parts of glacial acetic acid, 7½ parts of acetic anhydride, and 1.6 parts of sulfuric acid. In this mixture, the sulfuric acid has been converted into acetyl sulfuric acid by reaction with acetic anhydride. (This mixture in preference to one containing no acetic anhydride is used, because it has been found that acetyl sulfuric acid produces cellulose acetate of somewhat lower combined sulfate content and, therefore, of better stability.) The temperature of the mixture rises somewhat after the addition of the catalyst, but is maintained at or below 26° C. by means of cooling water. After 3½ hours total time, the temperature has been brought back to 20° C. and 27½ parts acetic anhydride are then added and one hour later an additional 210 parts acetic anhydride are added. The temperature is then allowed to rise to about 55° C. and when acetylation is completed, as is evidenced by complete solution, 210 parts of 60% acetic acid are added. The temperature of the solution is raised to 60°–65° C. and about two hours later another portion of 210 parts of 60% acetic acid is added. The mixture is saponified at a temperature between 60° C. and 65° C. for ten to fifteen hours, or until the combined acetic acid of the cellulose acetate is reduced to about 56.5%. When this point is reached, 750 pounds of 18% acetic acid preheated to 65° C. are added to the mixture, and the mixture held at 65° C. for an additional period of approximately ten hours, at the end of which time the combined acetic acid has dropped to between 54% and 55%. The solution is then filtered and precipitated in 2,500 parts of water. The precipitated cellulose acetate contains between 0.010% and 0.015% combined sulfate.

2,000 pounds of cellulose acetate prepared in this manner are washed with hard water containing 80 to 100 parts per million of hardness, expressed as calcium carbonate, of which 20 to 30 parts are magnesium carbonate, until the acidity has been completely eliminated and the alkalinity of the effluent wash water is substantially the same as that of the influent water. The mixture is next washed with demineralized water or distilled water which is passed into the cellulose acetate at the rate of 200 pounds per minute until 30,000 pounds of water have passed through the mass. The cellulose acetate is then dried.

Example II 2,000 parts of cellulose acetate prepared according to the method described in Example I and containing 0.01% to 0.015% combined sulfates previously precipitated from an acid solution are washed with demineralized or distilled water until substantially free of acid. The end point of washing may be determined as described previously, for instance, by means of a suitable indicator, or by electrometric methods, and the pH of the effluent water should be at least 4.5. To this cellulose acetate which is in a slurry with 40,000 parts of water, there is added 0.4 part of solid magnesium carbonate and the slurry stirred for ½ hour. Following neutralization, the slurry is washed with distilled or demineralized water at the rate of 185 parts of water per minute for three hours. The acetate is then drained and dried.

In case the tap wash water normally available for washing the cellulose acetate is relatively low in magnesium ions, magnesium salt may be added, such as, for instance, from 20 to 50 parts of magnesium carbonate per million parts of water. Instead of using hard water as provided by nature, substantially mineral-free water to which has been added the desired quantity of magnesium carbonate or an equivalent material may, of course, be used. In the modification described under Example II, the amount of solid magnesium carbonate which is added to the washed cellulose acetate may be varied quite widely, for instance, between 0.2 and 2 parts per 2,000 parts of cellulose acetate, and preferably between 0.4 and 1 part per 2,000 parts of cellulose acetate. It is, of course, desirable not to add any great excess of magnesium salt, since this means that more washing with mineral-free water following this addition will be needed. In place of magnesium carbonate other magnesium salts such as magnesium acetate or magnesium citrate may be used. Other alkaline earth metal or alkali metal salts of weak acids may also be used.

Generally, the washing following neutralization may be varied from 1 to 5 hours, depending on the amount of salt introduced and the rate of washing. In all cases the rate and time of washing are preferably adjusted so that the original solution on the cellulose acetate is essentially displaced with fresh mineral-free water. Care must be taken, however, that the cations which have attached themselves to the sulfate radicals of the cellulose acetate are not removed by the subsequent washing with mineral-free water. The washing with mineral-free water for the removal of mineral salts should be discontinued as soon as the mineral salts have been substantially removed. It has been found that if the washing is continued for a substantial period of time after the mineral salts have been removed, the cations which have attached themselves to the sulfate radicals will also be removed, and the cellulose acetate, as a consequence, will again become unstable. In order to substantially remove excess mineral salts and yet prevent removal of attached cations, it has been found that the quantity of mineral-free water put through the cellulose acetate for the removal of excess mineral salts should generally be no more than 30 pounds and no less than 5 pounds, and preferably between 10 and 20 pounds, per pound of cellulose acetate. The rate of washing with mineral-free water should generally be maintained between 0.05 and 0.2 pound of water per minute per pound of cellulose acetate, and preferably between 0.1 and 0.15 pound per minute per pound of cellulose acetate. Of course, it may be possible to wash with a smaller quantity of water than above set forth if the washing is carried out at a very low rate, or a larger quantity of water may be used if the washing is carried out at a very high rate. The amount of wash water used and the rate of washing must be so regulated that the washing is discontinued substantially at the time when the excess mineral salts have been removed. This can be determined by titration with well known indicators, or by determining the pH of the effluent wash water by known electrometric methods.

Preferably, the method of the present invention is combined with the process of acetylation which will produce a cellulose acetate containing no more than about 0.015% combined sulfate radicals.

If desired, the cellulose acetate may be bleached, for instance, with a dilute solution of potassium permanganate followed by discharge with a weak oxalic acid solution and further washing.

In the copending application of Ferdinand Schulze and Merle A. Heath filed of even date herewith, there is disclosed a method for the acetylation of cellulose in the presence of sulfuric acid as the catalyst, which sulfuric acid is present in sufficient amount to carry out the acetylation but in no case exceeds 2% of the weight of the air-dry cellulose entering the reaction, and no additional amount of sulfuric acid or other catalyst is added to the cellulose acetate during the hydrolysis thereof.

By this process it is possible to produce a cellulose acetate containing not to exceed 0.015% of combined sulfate radicals.

The present invention may be combined very advantageously with the invention of Schulze and Heath referred to above. By acetylating cellulose in such a manner that it will contain no more than about 0.015% of combined sulfate radicals, and then neutralizing the remaining combined sulfate radicals with a predetermined amount of an alkali metal or alkaline earth metal salt, a cellulose acetate which is extremely stable to heat may be produced.

The present invention may also be advantageously combined with the steam stabilization process as disclosed in the copending application of Ferdinand Schulze and Bruce S. Farquhar filed of even date herewith. In accordance with this combination the freshly precipitated cellulose acetate, prepared in accordance with any of the conventional processes for the acetylation of cellulose, and containing from .03% to .07% combined sulfate radicals, is first washed with mineral-free water until the effluent water contains no more than .1% acetic acid. If the so-washed cellulose acetate is then subjected to the action of wet steam under a pressure of about 60 pounds per square inch for a period of less than one hour to desulfur the same, the combined sulfate radicals in the resulting cellulose acetate may be reduced to only 0.01%. In this case the remaining combined sulfate radicals may then be neutralized in accordance with the method outlined above.

The term "mineral-free water" as used throughout the specification refers to water having no more than 10 parts of mineral residue, nor more than 0.2 part of alkaline earth metals, per million parts of water and having a pH value of at least 5. Until recently, distilled water was the only type of water generally suitable for this purpose and this would be far too expensive to be practical. Fortunately, it is now possible to obtain water having a high degree of purity, a pH value about 5, and freedom from mineral salts by quite simple and inexpensive methods. Cations may be removed from the water by percolating it through a bed of water-insoluble resin which contains free acid groups. Cations combined with the acidic resin with the liberation of hydrogen ions. The metallic salts originally present in the water are thus converted to the corresponding acids. The effluent from the cation-accepting unit is then passed through a basic resin containing amino groups which combine with the acid present in the water with the result that the effluent from the two combined units is virtually free of mineral matter. The two units can be regenerated after they are exhausted by treating them respectively with solutions of strong mineral acid and strong alkali. The water obtained from a softening system of this type may be further purified by percolating it through a bed of activated carbon to remove organic coloring matter.

The results obtained when water is softened in a system such as just described is shown by the following typical analyses. All the tabulated figures are expressed in parts per million.

|  | Influent raw water | Effluent from cation acceptor | Effluent from anion acceptor |
| --- | --- | --- | --- |
| Total residue | 72 | 9.0 | 8.0 |
| Loss on ignition | 15 | 1.0 | 1.0 |
| Fixed residue | 57 | 8.0 | 7.0 |
| Alkalinity | 61 | <2.0 | <2.0 |
| Sulfates | 2 | 2 | 0.1 |
| Soap hardness | 46 | 0 | 0 |

Since it is obvious that many changes and modifications can be made in the details above described without departing from the nature and spirit of the invention, it is to be understood that the invention is not to be limited to these details except as set forth in the appended claims.

I claim:

1. The process of producing highly stable organic acid esters of cellulose which comprises essentially washing a freshly precipitated organic acid ester of cellulose containing combined sulfate radicals with water containing a salt from the group consisting of alkali metal and alkaline earth metal salts whereby to neutralize the sulfate radicals with cations from the group consisting of alkali metal and alkaline earth metal cations, then removing excess mineral salts from the cellulose ester by washing the same with no more than 30 pounds and no less than 5 pounds of mineral-free water per pound of ester, the latter washing operation being carried out at a rate of between 0.05 pound and 0.2 pound per minute per pound of ester, said mineral-free water having no more than 10 parts of mineral residue, nor more than 0.2 part of alkaline earth metals, per million parts of water and having a pH value of at least 5.

2. The process of producing highly stable cellulose acetate which comprises essentially washing a freshly precipitated cellulose acetate containing combined sulfate radicals with water containing a salt from the group consisting of alkali metal and alkaline earth metal salts whereby to neutralize the sulfate radicals with cations from the group consisting of alkali metal and alkaline earth metal cations, then removing excess mineral salts from the cellulose acetate by washing the same with no more than 30 pounds and no less than 5 pounds of mineral-free water per pound of ester, the latter washing operation being carried out at a rate of between 0.05 pound and 0.2 pound per minute per pound of ester, said mineral-free water having no more than 10 parts of mineral residue, nor more than 0.2 part of alkaline earth metals, per million parts of water and having a pH value of at least 5.

FERDINAND SCHULZE.

CERTIFICATE OF CORRECTION.

Patent No. 2,300,180.   October 27, 1942.

FERDINAND SCHULZE.

It is hereby certified that error appears in the printed specification of the above numbered patent requiring correction as follows: Page 1, second column, line 9, for "products" read --produces--; page 3, second column, line 13, for "about" read --above--; and that the said Letters Patent should be read with this correction therein that the same may conform to the record of the case in the Patent Office.

Signed and sealed this 1st day of December, A. D. 1942.

(Seal)

Henry Van Arsdale,
Acting Commissioner of Patents.